United States Patent [19]

Trochimcznk et al.

[11] Patent Number: 5,712,347
[45] Date of Patent: Jan. 27, 1998

[54] GRAFTED METHYLENEDIPHOSPHONATE ION EXCHANGE RESINS

[75] Inventors: Andrzej W. Trochimcznk, Knoxville, Tenn.; Ralph C. Gatrone, Plymouth, Pa.; Spiro Alexandratos, Knoxville, Tenn.; E. Philip Horwitz, Naperville, Ill.

[73] Assignees: ARCH Development Corp., Chicago, Ill.; University of Tennessee Research Corp., Knoxville, Tenn.

[21] Appl. No.: 829,998

[22] Filed: Apr. 3, 1997

Related U.S. Application Data

[62] Division of Ser. No. 383,798, Feb. 6, 1995, Pat. No. 5,618,851.

[51] Int. Cl.$^6$ ............................ C08F 8/40; C08G 79/04
[52] U.S. Cl. .................... 525/340; 521/30; 521/32; 521/33; 521/34; 525/403; 525/538
[58] Field of Search .......................... 525/340, 403, 525/538; 521/30, 32, 33, 34

[56] References Cited

PUBLICATIONS

Sundell et al, Reactive Polymers, 25:1–16 (1995).

*Primary Examiner*—Fred Zitomer
*Attorney, Agent, or Firm*—Welsh & Katz, Ltd.

[57] ABSTRACT

An ion exchange resin is disclosed that is comprised of an insoluble copolymer onto which are grafted pendent groups that provide 1.0 to about 10 mmol/g dry weight phosphorous. The pendent groups have the formula

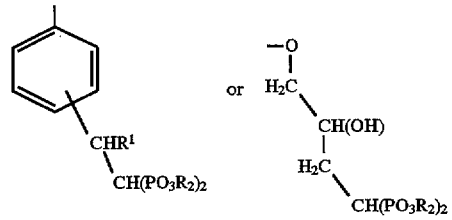

wherein R is hydrogen, a cation or mixtures thereof; and $R^1$ is hydrogen or an $C_1$–$C_2$ alkyl group. The resin also contains zero to about 5 mmol/g dry weight of pendent aromatic sulfonate groups. Processes for making and using an ion exchange-resin are also disclosed.

11 Claims, No Drawings

GRAFTED METHYLENEDIPHOSPHONATE ION EXCHANGE RESINS

This is a division of application Ser. No. 08/383,798, filed Feb. 6, 1995, now U.S. Pat. No. 5,618,851.

DESCRIPTION

1. Governmental Rights

This invention was made with government support pursuant to Contract No. W-31-109-ENG-38 between the U.S. Department of Energy and The University of Chicago, contractor for Argonne National Laboratory. The Government has certain rights in this invention.

2. Technical Field

This invention relates to tetraalkyl ester, partial esters, acid and salts forms of grafted ion exchange and bifunctional ion-exchange/coordination resins, and more particularly to ion exchange resins prepared from insoluble, cross-linked vinyl and, divinyl aliphatic and/or aromatic copolymers that contain methylenediphosphonate in the form of a tetraalkyl ester, partial ester, acid or salt, and can also contain aromatic sulfonic groups, as well as to methods of synthesis of these ion-exchange and bifunctional ion-exchange/coordination resins.

3. Background Art

Phosphonic acid cation-exchangers and particularly sulfonic acid cation-exchangers are well known. Recently, polymers containing methylenediphosphonate units were synthesized. See, for example, U.S. Pat. Nos. 5,256,808 and 5,281,636. These polymers are widely used in ion-exchange processes, in heterogenous catalysis, and in removal of cations from various liquids.

In further examples, Alexandratos et al., in *Emerging Separation Technologies for Metals and Fuels*, Lakshmanan et al., eds., The Minerals, Metals & Materials Society (1993) pages 111–117 report data on several copolymer systems that utilized vinylidene diphosphonate esters along with several other monomers. This publication also disclosed the benefit of sulfonating polymerized aromatic groups in the copolymer in providing enhanced extraction of a polyvalent metal ion such as Eu(III).

In other recent work, Sundell et al., *Polymer Preprints*, 33:992–993 (1992), reported a complex synthesis of 1-vinylphenylpropane-2,2-bis(phosphonic acid), and its copolymerization with styrene and divinylbenzene to form a cross-linked copolymer. Those copolymers were used with palladium as hydrogenation catalysts.

This paper reported that the resulting copolymer contained 0.48 mmol of phosphonic acid/g of polymer. The paper also relates that only 75 percent of the bisphosphonic acid groups were present on the surface of the polymer and available to bind Cu(II). This paper also disclosed the relative difficulty encountered in copolymerizing the monomers due to the lack of solubility of the bis(phosphonic acid) monomer in the emulsions used.

The above authors provided further results for their hydrogenation catalysts in Sundell et al., *Chem. Mater.*, 5(3):372–376 (1993). In that disclosure, results for four microemulsion polymer preparations were provided that showed that up to 0.48 mmol/g phosphorous could be incorporated into the copolymer with up to 82 percent of those phosphorous atoms being on the copolymer surface and accessible to Cu(II). The use of an alcoholic diluent during a second set of polymerizations provided a polymer with up to 0.59 mmol/g phosphorous, but with a still lower accessibility of only 43 percent.

BRIEF SUMMARY OF THE INVENTION

In one embodiment, a contemplated ion exchange resin comprises an insoluble cross-linked copolymer having grafted pendent groups of the formula

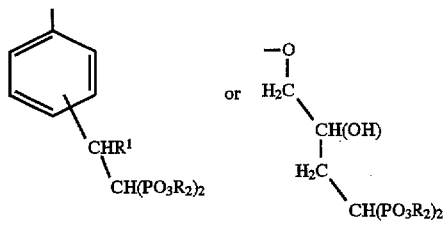

wherein R is selected from the group consisting of hydrogen, a $C_1$–$C_8$ alkyl group, a cation, and mixtures thereof; and $R^1$ is hydrogen or a $C_1$–$C_2$ alkyl group, wherein phosphorous-containing pendent groups are present at 1.0 to about 10 mmol/g dry weight of said copolymer;

and the resin also contains zero to about 5 mmol/g dry weight of pendent aromatic sulfonate groups. The mmol/g values are based on the polymer where R is hydrogen.

Preferably, a contemplated ion exchange resin contains about 2 to about 7 mmol/g dry polymer weight of phosphorous in those pendent groups. More preferably, the ion exchange resin also contains about 0.1 to about 4 mmol/g dry polymer weight of pendent aromatic sulfonate groups, and more preferably still about 2.5 to about 3.5 mmol/g of pendent aromatic sulfonate groups. A contemplated ion exchange resin is preferably sized to pass through a 4 millimeter sieve opening and be retained on a sieve having an opening of about 0.004 millimeters.

A particularly preferred ion exchange resin is comprised of a copolymer having the above preferred amounts of pendent phosphonate and aromatic sulfonate groups. A particularly preferred copolymer from which the grafted ion exchange resin is prepared contains about 10 to about 95 mole percent reacted vinylbenzyl halide or glycidyl acrylate or methacrylate, about 2 to about 85 mole percent reacted vinyl aromatic monomer selected from the group consisting of styrene, ethyl styrene, vinyltoluene and vinylxylene, and about 2 to about 20 mole percent of a reacted cross-linking agent selected from the group consisting of divinylbenzene, trimethylolpropane triacrylate and trimethylolpropane trimethacrylate.

A process for using tetra-$C_1$–$C_8$ alkyl methylenediphosphonate carbanion to prepare a contemplated ion exchange resin constitutes another embodiment. In accordance with that process, (a) a reaction mixture is formed by admixing insoluble cross-linked copolymer particles containing about 10 to about 95 mole percent copolymerized (reacted) vinylbenzyl halide or glycidyl acrylate or methacrylate monomer and a sufficient amount of tetra-$C_1$–$C_8$ alkyl methylenediphosphonate carbanion in a hydrocarbon solvent to form 1.0 to about 10 mmol/g of said pendent groups. The particles are sized to pass through a 4 millimeter sieve opening and be retained on a sieve having an opening of about 0.004 millimeters. (b) The reaction mixture is maintained at a temperature of about 25° to about 250° C. for a time period sufficient for a resin with the stated amount of pendent groups to form as product. (c) That resin product containing pendent $C_1$–$C_8$ alkyl phosphonate ester groups is then recovered. The recovered ester product is thereafter preferably hydrolyzed to the phosphonic acid or salt.

Preferably, the insoluble cross-linked copolymer particles contain at least 10 mole percent reacted monomers that contain an aromatic ring. The above process is then continued with the further steps of (d) sulfonating the recovered product of step (c) to form an insoluble cross-linked copolymer having about 0.1 to about 4 mmol/g pendent aromatic sulfonate groups. (e) The tetra-$C_1$–$C_8$ alkyl phosphonate groups are then hydrolyzed to form an insoluble copolymer having pendent aromatic sulfonate and methylenediphosphonic acid group as a second product. (f) The second product is then recovered.

A principal use of a contemplated resin is in selectively separating trans-actinide cations from other cations, particularly polyvalent cations, in strongly acidic aqueous solutions; i.e., aqueous solutions having a pH value of about 1 or less. To that end, also contemplated herein is an aqueous composition comprising in admixture, (a) water having a pH value of about 1 or less, (b) a plurality of ion exchange resin particles comprised of insoluble cross-linked copolymer particles that are sized to pass through a 4 millimeter sieve opening and be retained on a sieve having an opening of about 0.004 millimeters. The exchange resin has more than 1.0 to about 10 mmol/g dry weight of pendent groups having the formula

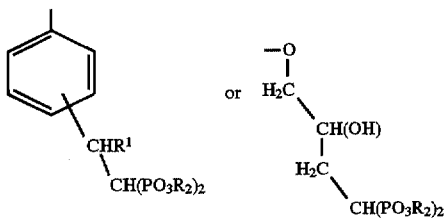

wherein R is hydrogen, a cation or mixtures thereof; and $R^1$ is hydrogen or an $C_1$–$C_2$ alkyl group; and the resin also contains zero to about 5 mmol/g dry weight of pendent aromatic sulfonate groups. The mmol/g values are based on the polymer where R is hydrogen. Also present in that aqueous admixture is (c) a plurality of cations that include at least one polyvalent cation having an atomic number of 90 or more.

The present invention has several benefits and advantages.

One advantage is that a contemplated resin can be readily prepared in high yields using straightforward chemical reactions.

A benefit of the invention is that its resins can be prepared to contain relatively large amounts of pendent methylenediphosphonate groups; i.e., about 1–10 mmol/g.

Another advantage of the invention is that an easily prepared contemplated resin has ion exchange and coordination exchange properties similar to harder-to-prepare resins known in the art.

Another benefit of the invention is that because of their method of preparation, the contemplated resins not only have relatively large amounts of pendent methylenediphosphonate groups, but those pendent groups are accessible to an aqueous medium rather than being buried within the polymer matrix.

Still further advantages and benefits of the invention will be apparent to workers skilled in the art from the discussion that follows.

DETAILED DESCRIPTION OF THE INVENTION

The Resins

A resin contemplated herein contains methylenediphosphonate groups that are present as tetra-$C_1$–$C_8$ alkyl esters on preparation, and which esters are hydrolyzed to a partial ester, the diphosphonic acid or diphosphonate salts for use. Unless otherwise specified, these phosphorous-containing groups are generally referred herein to as "phosphonate" groups for ease in explication, and use of the word "phosphonate" is intended to include the above-discussed tetra ester, partial ester, free acid and salt.

The phosphonate groups (and aromatic sulfonate groups discussed hereinafter) are referred to as being pendent. The word "pendent" is used to emphasize that the phosphonate (and/or sulfonate) groups are not part of the copolymer backbone, but rather "hang" from that copolymer backbone via the intermediacy of another organic group.

A contemplated resin is also referred to as having the pendent phosphonate groups; i.e., methylenediphosphonate groups, grafted onto the copolymer. As such, a copolymer resin having grafted pendent groups has those groups accessible to a liquid such as an aqueous solution of cations as compared to those pendent groups being buried within the insoluble copolymer and being inaccessible.

Thus, when formed by copolymerization of a methylenediphosphonate-containing monomer as described in U.S. Pat. No. 5,281,631 or in the Sundell et al., *Polymer Preprints*, 33:992–993 (1992) and Sundell et al., *Chem. Mater*, 5(3):372–376 (1993) papers, the methylenediphosphonate groups can be inaccessible for binding or exchange, and therefore useless to a worker. For example, Sundell et al., *Chem. Mater.*, 5(3):372–376 (1993) reported copolymers prepared from 1-vinylphenylpropane-2,2-bis(phosphonic acid) that contained only 0.27 to 0.59 mmol/g phosphorous in which the phosphorous was 34 to 82 percent accessible to an aqueous polyvalent metal ion [Cu(II)]. On the other hand, a contemplated grafted resin not only contains more phosphonate groups, but those groups have greater accessibility because of their being added (grafted) after the insoluble copolymer was formed so fewer phosphorous-containing groups are inaccessible.

It is noted that the pendent phosphorous-containing groups illustrated herein are not the complete, polymerized monomers to which the methylenediphosphonate groups have been grafted. Rather, those depictions illustrate salient features of the grafted, polymerized monomer. For example, one illustration includes only a bond to a benzene ring, an intermediate methylene, ethylene or propylene group (—$CHR^1$—) and the bonded methylenediphosphonate. The two carbon polymer backbone atoms are not shown. Similarly, the other depiction only shows the reacted glycidyl ester portion of the reacted, polymerized monomer without showing the backbone-containing polymerized acrylate or methacrylate portions.

A contemplated resin is also referred to herein as an ion exchange resin. Without wishing to be bound by theory, it is believed, however, that a contemplated resin selectively separates polyvalent metal ions by both ion exchange and coordination mechanisms, with the coordination mechanism operating mostly in solutions having a pH value less than 1, such as those containing 1–6M nitric acid. Nevertheless, because a contemplated resin can act by an ion exchange mechanism, and for ease of understanding, a contemplated resin will usually be referred to herein as an ion exchange resin.

A copolymer onto which the pendent phosphonate groups are grafted is insoluble in water as well as in organic solvents such as benzene, hexane, diethyl ether, acetone, ethyl acetate, dimethyl formamide (DMF), dimethyl sulfoxide (DMSO) and hexamethylphosphoramide (HMPA).

A contemplated ion exchange resin thus comprises an insoluble cross-linked copolymer having grafted pendent groups of the formula

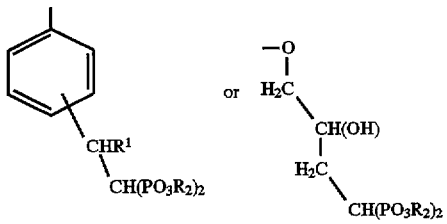

wherein R is selected from the group consisting of hydrogen, a $C_1$–$C_8$ alkyl group, a cation, and mixtures thereof; and $R^1$ is hydrogen or a $C_1$–$C_2$ alkyl group wherein phosphorus-containing pendent groups are present at 1.0 to about 10 mmol/g dry weight of said copolymer and the mmol/g values based on said polymer where R is hydrogen. The resin also contains zero to about 5 mmol/g dry weight of pendent aromatic sulfonate groups.

A contemplated copolymer can contain a $C_1$–$C_8$ alkyl phosphonate ester. Exemplary $C_1$–$C_8$ alkyl groups of those esters and other $C_1$–$C_8$ alkyl groups noted herein include methyl, ethyl, propyl, isopropyl, butyl, t-butyl, pentyl, cyclopentyl, hexyl, cyclohexyl, 4-methylcyclopentyl, heptyl, octyl, cyclooctyl, 3-ethylcyclohexyl and the like, as are well known. An isopropyl group is a preferred R group. An $R^1$ $C_1$–$C_2$ alkyl group is a methyl or ethyl group.

In addition to being a $C_1$–$C_8$ alkyl group, R in the above formula can also be hydrogen (a proton), or a cation. An R cation can be mono- or polyvalent and is shown in the formula as being monovalent for ease of depiction. Exemplary cations include alkali metal and alkaline earth metal ions such as lithium, sodium, potassium, magnesium, calcium and strontium, transition metal ions such as manganese, cobalt, nickel, iron, cadmium, copper, silver, palladium, mercury and lead, lanthanides such as lanthanum, cerium, europium, neodymium and holmium, and actinides such as thorium, uranium, americium and the like. An R cation can also be ammonium ion ($NH_4^+$) as well as a protonated mono-, di- or tri-$C_1$–$C_8$ alkyl amine or quaternary ammonium ion, wherein the $C_1$–$C_8$ alkyl groups are as discussed herein. Exemplary amines in unprotonated form include mono-, di- and tri-methylamines, mono-, di- and tri-ethylamines, mono-, di- and tri-hexylamines, mono-, di and tri-isopropanolamines, mono-, di- and tri-octylamines, and the like. Exemplary quaternary ammonium ions include tetramethylammonium, tetraethylammonium, and tetraoctylammonium ions, and the like.

As is the case of ion exchange resins generally, an R cation of a contemplated ion exchange resin can be changed at will from a first cation (including a proton) to a second cation by simply washing an aqueous composition of a resin first cation salt with an aqueous solution having an excess of the second cation. These procedures are well known and need not be discussed further.

The reacted monomers of a contemplated resin copolymer are quite varied. Exemplary reacted monomers are styrene, ethyl styrene, vinyltoluene, vinylxylene, acrylonitrile, a $C_1$–$C_8$ alkyl acrylate or methacrylate, a vinyl $C_1$–$C_8$ acyl ester, vinylchloride, a $C_1$–$C_8$ alkyl vinyl ether, a vinyl benzylhalide such as α-bromo- or α-fluoromethyl styrene and glycidyl acrylate or methacrylate.

A contemplated $C_1$–$C_8$ acyl group is an acyl form of one of the above $C_1$–$C_8$ alkyl groups, as appropriate. Some $C_1$–$C_8$ alkyl groups such as cyclohexyl and t-butyl do not have corresponding acyl groups as is well known.

A contemplated insoluble copolymer must contain at least 1.0 mmol/g dry polymer weight and preferably about 2.0 mmol/g of a reacted (copolymerized) vinylbenzyl halide or glycidyl acrylate or methacrylate or both so that the above amount of pendent phosphonate groups can be prepared. In addition, where a pendent aromatic sulfonate is present as is preferred, an appropriate amount of reacted aromatic monomer such as styrene, vinyl toluene or the like must also be present.

Preferably, the insoluble copolymer contains at least 2 mole percent reacted vinylbenzyl halide or glycidyl acrylate or methacrylate, with that percentage more preferably being about 10 to about 95 mole percent. One or more reacted monoethylenically unsaturated monomers as discussed before are present at about 2 to about 85 mole percent, with this monomer preferably including at least 5 mole percent of an above monoethylenically unsaturated aromatic monomer such as styrene, ethyl styrene, vinyl toluene (methyl styrene) and vinyl xylene.

A useful insoluble copolymer also includes a reacted cross-linking agent (cross-linker). Reacted cross-linking agents useful herein are also quite varied. Exemplary cross-linking agents useful herein are selected from the group consisting of divinylbenzene, trimethylolpropane triacrylate or trimethyacrylate, erythritol tetraacrylate or tetramethacrylate, 3,4-dihydroxy-1,5-hexadiene and 2,4-dimethyl-1,5-hexadiene. Divinylbenzene is particularly preferred here.

The amount of reacted cross-linker is that amount sufficient to achieve the desired insolubility. Typically, at least 0.3 mole percent reacted cross-linker is present. The reacted cross-linking agent is preferably present at about 2 to about 20 mole percent.

Resin Preparation

The contemplated resins are the multi-step reaction product of a nucleophilic agent such as $CH[P(O)(OR)_2]^-$, which can be obtained by known methods, with a substrate. Thus, $CH_2[P(O)(OR)_2]$ is first reacted with sodium or potassium metal, sodium hydride or organolithium compounds, e g., butyllithium, or any agent capable of generating a diphosphonate carbanion. The resulting carbanion is then reacted with a substrate that is a before-discussed insoluble cross-linked copolymer of one or more of vinyl aliphatic, acrylic, or aromatic compounds and a polyvinyl aliphatic, acrylic, or aromatic compound, e.g., divinylbenzene, which copolymer contains at least 2 mole percent of a reacted halogenated derivative of vinyl aromatic hydrocarbon such as vinylbenzyl chloride, or other group capable of undergoing nucleophilic attack, preferably from 10 to 95 mole percent, about 2 to about 85 mole percent of monovinyl aromatic hydrocarbon such as styrene and at least 0.3 mole percent of polyvinyl aliphatic and/or aromatic cross-linker such as divinylbenzene, preferably 2–20 mole percent.

A suitable insoluble, cross-linked copolymer can be obtained by any well known method used in styrene or acrylate polymerization (e.g., suspension and emulsion polymerization) but the suspension method is preferred because the insoluble copolymer is formed as beads suitable for column separation processes and the diameter of the beads can be easily controlled. Such polymerization can be performed in the presence of none; i.e., neat or without diluent as a bulk polymerization, to about 90 weight percent of inert solvent or diluent such as alcohols, aliphatic and aromatic hydrocarbons of any of their mixtures. The vinyl aromatic compounds can contain lower alkyl groups with 1 to 3 carbon atoms in addition to the vinyl group. Examples of such monomers are vinyltoluene and vinylxylene.

The next step in preparing a contemplated resin is the substitution of a methylenediphosphonate group for the halogen atom in the halomethyl groups on the aromatic units (e.g., vinylbenzyl chloride) or, for example, the epoxide group in glycidyl acrylate or methacrylate. The copolymer containing such units is reacted with the carbanion $CH[P(O)(OR)_2]^-$. Halogen is thereby displaced from the halomethyl groups or epoxy groups are opened, and a polymeric resin containing pendent methylenediphosphonate groups is formed.

The reaction of tetraalkyl methylenediphosphonate (after it is converted into a carbanion with sodium or potassium metal, sodium hydride, butyllithium, etc.) with insoluble, cross-linked copolymer containing halomethyl, ester, or epoxy groups to graft the phosphorous-containing pendent groups can be carried out at temperatures between about $-25°$ and about 250° C., preferably from about 100° to about 170° C. The reaction is preferably carried out while the copolymer is swollen by an organic solvent such as toluene, xylenes, ethylbenzene or mesitylene.

Thus, the reaction is preferably carried out by swelling a before-discussed insoluble cross-linked polymer in one of the aforementioned solvents for 0.1–2 hours at a temperature from ambient to the boiling point of the solvent, and subsequent addition of a 1- to 5-fold excess of tetraalkyl methylenediphosphonate carbanion in a small amount of the same solvent. Reaction is usually carried out by refluxing a mixture at atmospheric pressure for one to 48 hours, preferably 10 to 24 hours.

The grafted resin product so prepared is recovered by separation from the liquid by filtering, centrifugation, decantation and the like. The resin can be washed with organic solvents such as benzene, toluene or ethylbenzene to free the product of unreacted tetraalkyl methylenediphosphonate and dried.

The resin containing methylenediphosphonate tetraalkyl ester groups in an amount corresponding to about 1.0 mmol/g of dry weight, preferably from 2 to 7 mmol/g of dry weight, is preferably reacted with a sulfonating agent such as chlorosulfonic acid, concentrated sulfuric acid or sulfur trioxide in order to introduce strongly acidic pendent aromatic sulfonic groups (shown below in pertinent part as before) into their structure. The presence of the sulfonate pendent groups confers the additional advantage of hydrophilicity to the resin and leads to a surprising enhancement in the rate of cation complexation without adversely affecting the observed selectivity.

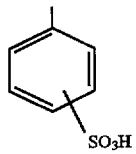

The reaction of the sulfonating agent with a resin containing methylenediphosphonate groups is usually carried out when the recovered resin product in ester form is swollen by a halohydrocarbon such as dichloromethane, ethylene dichloride, chloroform and 1,1,1-trichloroethane. The sulfonation reaction can be performed using 0.5 to 20.0 weight percent of chlorosulfonic acid in one of the mentioned halohydrocarbon solvent at temperatures ranging from about $-25°$ to about 50° C., preferably at about 10° to about 30° C., by contacting resin preswollen for zero (unswollen) to about two hours with the above solution for 0.25 to 20 hours, preferably 0.5 to two hours.

After completion of the sulfonation reaction, the resin is separated from the liquid reaction medium by filtration, centrifugation, decantation, or the like. This final, second resin product is carefully washed with dioxane, water, 1M NaOH, water, 1M HCl and water, and then dried.

The sulfonation reaction and work-up in water also hydrolyzes the phosphonate $C_1$–$C_8$ alkyl ester groups. Where sulfonation is not carried out, hydrolysis of the phosphonate esters can be carried out by reaction with an acid such as concentrated hydrochloric acid at reflux.

Thus, a process for using a tetra-$C_1$–$C_8$ alkyl methylenediphosphonate carbanion to prepare an ion exchange resin that is comprised of an insoluble copolymer containing grafted pendent tetra-alkyl $C_1$–$C_8$ alkyl methylenediphosphonate groups is contemplated. This process comprises the following steps:

(a) A reaction mixture is formed by admixing insoluble cross-linked copolymer particles containing about 10 to about 95 mole percent copolymerized vinylbenzyl halide or glycidyl acrylate or methacrylate monomer and a sufficient amount of tetra-$C_1$–$C_8$ alkyl methylenediphosphonate carbanion in a hydrocarbon solvent to form 1.0 to about 10 mmol/g of said pendent groups. The particles are sized to pass through a 4 millimeter sieve opening and be retained on a sieve having an opening of about 0.004 millimeters.

(b) The reaction mixture is maintained at a temperature of about 25° to about 250° C. for a time period sufficient for an ion exchange resin with said amount of pendent groups to form as product.

(c) The product containing pendent tetra-$C_1$–$C_8$ alkyl methlenediphosphonate groups is recovered.

Where the resin is used without containing pendent aromatic sulfonate groups, the $C_1$–$C_8$ alkyl ester groups are hydrolyzed after recovery of the resin.

Where a preferred ion exchange resin is prepared that contains grafted pendent methylenediphosphate and pendent aromatic sulfonate groups and in which the copolymer contains at least 10 mole percent aromatic (phenyl) rings, the above process continues with the following steps:

(d) The recovered product of step (c), above, is sulfonated to form an ion exchange resin having about 0.1 to about 4 mole percent pendent aromatic sulfonate groups.

(e) The tetra-$C_1$–$C_8$ alkyl phosphonate groups are hydrolyzed to form an ion exchange resin having pendent aromatic sulfonate and methylenediphosphonic acid groups as a second product.

(f) That second product is then recovered.

The sulfonation and hydrolsis steps [steps (d) and (e)] have been written separately here, but it is to be understood that work-up of the sulfonation reaction leads to hydrolysis of the ester groups so both steps could be written together as a single step.

A contemplated resin contains as functional groups both methylenediphosphonate and sulfonate groups, directly attached to carbon atoms of aromatic units or acrylate or methacrylate units in the polymer matrix. A contemplated resin displays high affinity towards a wide range of divalent, trivalent and multivalent cations over a wide range of pH values. At a pH value below 1, the resins are able to switch from an ion-exchange mechanism of cation removal to a bifunctional ion-exchange/coordination mechanism due to the coordination ability of the phosphoryl oxygens. The sulfonic acid groups then act to make the matrix more hydrophilic for rapid metal ion access; the methylenediphosphonate groups are thus responsible for the high selectivity.

As has been noted elsewhere herein, a contemplated precursor insoluble copolymer can be prepared neat, in the absence of solvent or diluent by bulk polymerization techniques, or in the presence of a solvent or dispersing agent. A liquid solvent/dispersant is preferred here for use in a suspension polymerization so that the copolymer is prepared in the form of particles having a generally spherical shape; i.e., as beads, and a relatively narrow size distribution. Copolymer produced by bulk polymerization is typically broken to particles of irregular shape and a wide size distribution.

A contemplated copolymer particle and completed ion exchange resin particle can have a size such that the particles pass through a sieve having a 4 millimeter (mm) opening and are retained on a sieve having an opening of about 0.004 mm. Resin particles that are sized to pass through a sieve screen with an opening of about 0.15 mm and be retained on a mesh of 0.004 mm are particularly useful for chromatographic separations. Larger sized particles are particularly useful as catalysts when complexed with palladium and for ion separations wherein the resin particles are filtered to effect a physical separation of one complexed polyvalent metal ion from one or more other mono- or polyvalent metal ions.

A resin prepared in accordance with the invention is capable of repeated use and regeneration in removing cations from solutions. The chemical composition of a contemplated resin assures long lifetime even in extreme conditions like those encountered in concentrated acids.

The preparation of ion-exchange/coordination resins containing both methylenediphosphonate and sulfonate groups on insoluble, cross-linked copolymers as herein described permits the production of ion-exchange/coordination resins with enhanced selectivity and improved kinetics of cation removal, especially in a low pH value range, than it has heretofore been obtained by the introduction of methylenediphosphonate or sulfonate groups alone.

Resins prepared as described herein have been used to separate polyvalent cations from acidic aqueous solutions. These resins exhibit separation and selectivity properties similar to those resins discussed in U.S. Pat. No. 2,256,808 and in Alexandratos et al., *Emerging Separation Technologies for Metals and Fuels*, Lakshamanan et al., eds., The Minerals, Metals & Materials Society (1993), pages 111–117. For example, Example 6 herein illustrates that a contemplated exchange resin containing pendent methylenediphosphonate and aromatic sulfonate groups complexed 52.7 percent of Eu(III) from an aqueous 5M nitric acid solution as compared to 5.4 percent complexation complexed by a strongly acid cation exchange resin having only sulfonic acid groups. Those results are comparable to the results reported in Table II of Alexandrtos et al., above, of 53.2 and 5.6 percent, respectively, for a Diphonix resin and sulfonic acid resin in an aqueous 4M nitric acid solution.

Ion Separation

As noted previously, a contemplated principal use contemplated for an ion exchange resin described herein is in a process of separation of one polyvalent metal cation from other mono- or polyvalent metal ions, particularly in extremely acidic aqueous environments wherein the pH value is about 1 or less. A contemplated resin is particularly useful in separating transactinide ions (those whose atomic number is 90 or greater) from other ions.

A contemplated separation can take place in a chromatographic environment as in ion exchange chromatography or in a bulk situation wherein resin particles are simply admixed with an aqueous solution containing the ion desired to be separated from other ions. Regardless of the specific technique used, an aqueous composition having three components is contemplated. That composition contains: (a) water having a pH value of about 1 or less; (b) a plurality of ion exchange resin particles as described previously and sized to pass through a 4 millimeter sieve opening and be retained on a sieve having an opening of about 0.004 millimeters; and (c) a plurality of cations that include at least one polyvalent cation having an atomic number of 90 or more. Use of a preferred resin as described hereinbefore is preferred here also.

The following examples illustrate a way in which the principles of the invention have been applied, but are not to be construed as limiting their scope.

Example 1: Insoluble Copolymer Containing Grafted Tetraisopropyl Methylenediphosphonate Pendent Groups Tetraisopropyl methylenediphosphonate (346.5 g; 1.0 mole) was dissolved in 1000 mL of dry toluene. To that solution, sodium metal (23.0 g; 1.0 mole) was added and the mixture was stirred overnight (about 18 hours) until sodium completely reacted.

Insoluble, cross-linked copolymer beads (100 g) were prepared by suspension polymerization of 67.47 weight percent vinylbenzyl chloride, 23.03 weight percent styrene, 5.0 weight percent divinylbenzene, and 0.5 weight percent benzoyl peroxide; ethylstyrenes were also present from the technical grade divinylbenzene. To introduce porosity, an equal amount of 1:1 (w/w) mixture of toluene and dodecane was added. The entire polymerization mixture was placed in a cylindrical reaction equipped with overhead stirrer, reflux condenser and thermometer, and was heated at 60° C. for one hour, 70° C. for one hour, 85° C. for two hours and finally at 95° C. for seven hours. Stirring speed was set to 280 rpm.

After polymerization was completed, the resulting cross-linked copolymer beads were separated on sieves, washed with hot water, water and acetone, then preswollen in toluene and extracted with this solvent for eight hours using Soxhlet apparatus, and then dried. The dried beads were placed in a three neck round bottom flask and preswollen with 500 ml of toluene for two hours at room temperature. A solution of sodium tetraisopropyl methylenediphosphonate was added to the flask and the entire mixture was reacted at reflux for 24 hours. After that time, the grafted resin was separated by filtration, washed with toluene, and dried. The beads contained 2.47 mmol of phosphorus/g of dry weight as determined by elemental analysis.

Example 2: Insoluble Copolymer Containing Grafted Tetraisopropyl Methylenediphosphonate Pendent Groups Insoluble, cross-linked copolymer beads (70.7 g) obtained by suspension polymerization of 90.5 weight percent vinylbenzyl chloride, 2.0 weight percent divinylbenzene, and 0.5 weight percent benzoyl peroxide (with the ethylstyrenes present in the technical grade divinylbenzene) were placed in a three neck found bottom flash and preswollen with 500 mL of toluene for two hours at room temperature. To this flask, a solution of sodium tetraisopropyl methylenediphosphonate, prepared as in Example 1, was added. The mixture was reacted at reflux for 20 hours. After that time, beads were separated and washed with toluene, and dried. The polymer contained 3.34 mmol of phosphorus/g of dry weight as determined by elemental analysis.

Example 3: Resin with Pendent Aromatic Phosphonate and Aromatic Sulfonate Groups Resin (50 g) containing tetraisopropyl methylenediphosphonate groups as obtained in Example 1 was placed in an erlenmeyer flask and preswollen with 300 mL of ethylene dichloride for one hour at room temperature. A solution of 50 mL chlorosulfonic acid in 150 mL of the same solvent was separately prepared, and then added to preswollen resin with continuous stirring. The chlorosulfonation reaction was carried out for one hour at room temperature. The sulfonated, diphosphonate resin was then separated from the reaction mixture by filtration, washed with dioxane, water, 1M NaOH, water, 1M HCl and with water, and then dried. The sulfonated, diphosphonate resin contained 2.26 mmol phosphorus/g of dry weight as determined by elemental analysis. Total acid capacity was 7.95 mmol/g of dry weight as obtained by NaOH titration.

Example 4: Insoluble Copolymer Containing Grafted Methylenediphosphonic Acid Pendent Groups Resin beads (100 g) containing tetraisopropyl methylenediphosphonate groups as obtained in Example 1 were preswollen in acetone for two hours, washed with a mixture of acetone and water (1:1 v/v), water and 1M HCl. The resin was placed in a round bottom flask together with 550 mL of concentrated hydrochloric acid. Hydrolysis was carried out by refluxing the mixture for eight hours. After that time, beads were separated by filtration, washed with water, 1M NaOH, water, 1M HCl and water, and then dried. The acid capacity of the thus obtained diphosphonate resin was 5.79 mmol/g of dry polymer, phosphorus content was 3.05 mmol/g of dry polymer and percentage of solid was 40.33 percent.

Example 5: Insoluble Copolymer Containing Grafted Methylenediphosphonic Acid and Pendent Groups Resin beads (50 g) of resin containing tetraisopropyl methylenediphosphonate groups as obtained in Example 2 were preswollen in acetone for one hour, washed with a mixture of acetone/water (1:1 v/v), water and 1M HCl. The resin was placed in a round bottom flask together with 300 mL concentrated hydrochloric acid. Hydrolysis was carried out by refluxing the mixture for six hours. After that time, the beads were separated by filtration, washed with water, 1M NaOH, water, 1M HCl and water, and then dried. The total acid capacity was 9.39 mmol/g of dry weight. The resin also contained 4.86 mmol of phosphorus/g of dry weight as found by elemental analysis.

Example 6: Separation of Eu(III) Ions

Enough resin beads, obtained as in Example 1 and sulfonated as in Example 3, to provide 0.05 mmol of phosphorus were shaken with 5 mL of $1 \times 10^{-4}$M solution of Eu(III) in 5M nitric acid for 30 minutes at room temperature. After that time, beads were separated by filtration and concentration of Eu(III) was measured using atomic emission with wavelength set to 459.4 nm. The resin was able to complex 52.7 percent of Eu(III) cations, whereas the reference polymer—a strongly acid cation-exchanger with sulfonic groups only—was able to complex 5.4 percent under the same conditions.

Example 7: Resin with Glycidyl Methacrylate— Pendent Tetraisopropyl Methylenediphosphonate Groups Tetraisopropyl methylenediphosphonate (346.5 g; 1.0 mole) was dissolved in 1000 mL of dry toluene. To that solution, 40 g of 60 weight percent NaH suspension in mineral oil (24 g; 1.0 mole of pure sodium hydride) were added in portions, and the mixture was stirred until all NaH was reacted and a solution of sodium tetraisopropyl methylenediphosphonate was formed.

Insoluble, cross-linked copolymer beads (100 g) were obtained by suspension polymerization of 2.0 weight percent of 2-ethyl-(2-hydroxymethyl)-1,3 propanediol trimethacrylate, 97 weight percent of glycidyl methacrylate and 1.0 weight percent of benzoyl peroxide. The beads were placed in a three-neck round bottom flask and preswollen with 500 mL of toluene for one hour at room temperature.

The above solution of sodium tetraisopropyl methylenediphosphonate was added to the flask and the entire reaction mixture was heated at reflux for 24 hours. The resulting resin product was separated by filtration, washed with toluene and dried. The dried resin contained 2.62 mmol of phosphorus/g of dry weight as determined by elemental analysis.

Example 8: Resin with Glycidyl Methacrylate- Pendent Methylenediphosphonic Acid Groups Resin beads (100 g) containing tetraisopropyl methylenediphosphonate groups (2.26 mmol of phosphorus/g of dry weight) as obtained in Example 7 were preswollen in acetone for 0.5 hour, washed with water and subsequently with 1M HCl. The resin beads were placed in a 1 L round bottom flask together with 600 mL of 5M hydrochloric acid solution. Hydrolysis was carried out by heating the mixture at reflux for two hours. After that time, resin beads were separated by filtration and conditioned with water, 1M NaOH, water, 1M HCl and water, and then dried. The total acid capacity for the hydrolyzed resin was 6.54 mmol/g of dry weight and phosphorus content was 3.22 mmol/g of dry weight as found by elemental analysis. Percentage of solid for this resin was 60.81 percent.

The foregoing description and the examples are intended as illustrative and are not to be taken as limiting. Still other variations within the spirit and scope of this invention are possible and will readily present themselves to those skilled in the art.

We claim:

1. A process for using tetra-$C_1$–$C_8$ alkyl methylenediphosphonate carbanion to prepare an ion exchange resin comprised of an insoluble cross-linked copolymer containing grafted pendent tetra-$C_1$–$C_8$ alkyl methylenediphosphonate groups comprising the steps of:
    (a) forming a reaction mixture by admixing insoluble cross-linked copolymer particles containing about 10 to about 95 mole percent copolymerized vinylbenzyl halide or glycidyl acrylate or methacrylate monomer and a sufficient amount of tetra-$C_1$–$C_8$ alkyl methylenediphosphonate carbanion in a hydrocarbon solvent to form 1.0 to about 10 mmol/g of said pendent groups,, said particles being sized to pass through a 4 millimeter sieve opening and be retained on a sieve having an opening of about 0.004 millimeters;

(b) maintaining said reaction mixture at a temperature of about 25° to about 250° C. for a time period sufficient for an ion exchange resin with said amount of pendent groups to form as product; and (c) recovering said product containing pendent tetra-$C_1$–$C_8$ alkyl methylenediphosphonate groups.

2. The process according to claim 1 wherein said tetra-$C_1$–$C_8$ alkyl methylenediphosphonate is tetraisopropyl methylene diphosphonate.

3. The process according to claim 1 wherein said insoluble cross-linked copolymer contains reacted monomers selected from the group consisting of styrene, ethyl styrene, vinyltoluene, vinylxylene, acrylonitrile, a $C_1$–$C_8$ alkyl acrylate or methacrylate, a vinyl $C_1$–$C_8$ acyl ester, vinylchloride, a $C_1$–$C_8$ alkyl vinyl ether, a vinyl benzyl halide and glycidyl acrylate or methacrylate.

4. The process according to claim 1 wherein said insoluble cross-linked copolymer contains a reacted cross-linking agent selected from the group consisting of divinylbenzene, trimethylolpropane triacrylate or trimethyacrylate, erythritol tetraacrylate or tetramethacrylate, erythritol tetraacrylate or tetramethacrylate, 3,4-dihydroxy-1,5-hexadiene and 2,4-dimethyl-1,5-hexadiene.

5. The process according to claim 1 wherein said product contains about 2 to about 7 mmol/g phosphorous after hydrolysis of the tetra-$C_1$–$C_8$ alkyl groups.

6. The process according to claim 1 wherein said insoluble cross-linked copolymer particles are generally spherical in shape.

7. The process according to claim 1 including the further step of hydrolyzing the tetra alkyl ester product recovered in step (c).

8. The process according to claim 3 wherein said insoluble cross-linked copolymer particles contain at least 10 mole percent reacted monomers that contain an aromatic ring and including the further steps of (d) sulfonating the recovered product of step (c) to form an ion exchange resin having about 0.1 to about 4 mole percent pendent aromatic sulfonate groups;

(e) hydrolyzing the tetra-$C_1$–$C_8$ alkyl phosphonate groups to form an ion exchange resin having pendent aromatic sulfonate and methylenediphosphonic acid groups as a second product; and (f) recovering said second product.

9. An aqueous composition comprising in admixture, (a) water-having a pH value of about 1 or less, (b) a plurality of ion exchange resin particles, said particles being sized to pass through a 4 millimeter sieve opening and be retained on a sieve having an opening of about 0.004 millimeters, said resin comprising an insoluble copolymer onto which are grafted pendent groups that provide phosphorous at 1.0 to about 10 mmol/g dry weight, said pendent groups having the formula

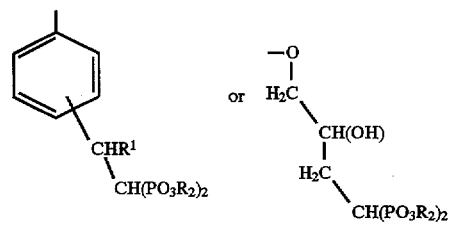

wherein R is hydrogen, a cation or mixtures thereof; and $R^1$ is hydrogen or an $C_1$–$C_2$ alkyl group;

said resin also containing zero to about 5 mmol/g dry weight of pendent aromatic sulfonate groups, said mmol/g values based on said polymer where R is hydrogen; and (c) a plurality of cations that include at least one polyvalent cation having an atomic number of 90 or more.

10. The aqueous composition according to claim 9 wherein said ion exchange resin particles contain about 2 to about 7 mmol/g phosphorous.

11. The aqueous composition according to claim 9 wherein said ion exchange resin particles contain about 0.1 to about 4 mmol/g dry weight of said pendent aromatic sulfonate groups.

* * * * *